US007565959B2

(12) United States Patent
Nalbach

(10) Patent No.: US 7,565,959 B2
(45) Date of Patent: Jul. 28, 2009

(54) ARTICLE ORIENTATING APPARATUS

(75) Inventor: John C. Nalbach, Oak Brook, IL (US)

(73) Assignee: John R. Nalbach Engineering Co, Inc., Countryside, IL (US)

( * ) Notice: Subject to any disclaimer, the term of this patent is extended or adjusted under 35 U.S.C. 154(b) by 197 days.

(21) Appl. No.: 11/901,470

(22) Filed: Sep. 18, 2007

(65) Prior Publication Data

US 2009/0071799 A1 Mar. 19, 2009

(51) Int. Cl.
*B65G 47/14* (2006.01)
(52) U.S. Cl. .................. 198/393; 198/392; 198/397.04; 198/397.05
(58) Field of Classification Search ............ 198/392, 198/393, 397.04, 397.05, 396, 397.02, 397.03, 198/397.01, 377.04, 377.08
See application file for complete search history.

(56) References Cited

U.S. PATENT DOCUMENTS

| 1,823,995 | A | 9/1931 | Streby |
|---|---|---|---|
| 2,538,706 | A | 1/1951 | Reynolds |
| 2,754,954 | A | 7/1956 | Kasper |
| 2,776,047 | A | 1/1957 | Howard |
| 3,285,387 | A | 11/1966 | Ochs |
| 3,318,434 | A | 5/1967 | Waller |
| 3,338,373 | A | 8/1967 | Aidlin |
| 3,446,335 | A | 5/1969 | Dubuit |
| 3,464,535 | A | 9/1969 | Eissele et al. |
| 3,517,796 | A | 6/1970 | Aidlin et al. |
| 3,543,909 | A | 12/1970 | Ueda |
| 3,624,773 | A | 11/1971 | Krooss |
| 3,650,368 | A | 3/1972 | Nalbach |
| 3,662,872 | A | 5/1972 | Nalbach |
| 3,791,553 | A | 2/1974 | Aidlin et al. |
| 3,826,405 | A | 7/1974 | Hoppman |
| 3,948,386 | A | 4/1976 | Nalbach |
| 4,130,194 | A | 12/1978 | Schindel |
| 4,238,023 | A | 12/1980 | Millar et al. |
| 4,578,001 | A | 3/1986 | Ochs |

(Continued)

FOREIGN PATENT DOCUMENTS

DE 3442612 6/1985

(Continued)

*Primary Examiner*—James R Bidwell
(74) *Attorney, Agent, or Firm*—Anthony S. Zummer

(57) ABSTRACT

An apparatus for orienting random oriented lightweight articles. The apparatus includes a wheel which rotates on an axis which is substantially horizontal. A plurality of alignment troughs is mounted on the interior of the wheel. Each of the alignment troughs has a longitudinal axis substantially parallel to the wheels horizontal axis. Each trough has a plurality of openings to allow air to pass through the trough and out of the wheel to hold lightweight articles in the troughs against the force of gravity. Each of the articles has a longitudinal axis which is parallel to the troughs longitudinal axis. Rotation of the wheel selectively positions the troughs with a source of air under pressure to move the articles to the end of the respective trough. Each article at the end of its respective trough moves into an external receiver where the article is transferred to a vertical attitude having the bottom up. The article is rotated to a bottom down attitude. A retriever positioned adjacent to the wheel retrieves each article in a vertical bottom down attitude and delivers each article to a conveyor.

18 Claims, 11 Drawing Sheets

U.S. PATENT DOCUMENTS

| | | | |
|---|---|---|---|
| 4,681,209 A | | 7/1987 | Marti |
| 4,705,156 A | | 11/1987 | Boling |
| 4,825,995 A | | 5/1989 | Nalbach |
| 4,865,181 A | | 9/1989 | Nalbach |
| 5,065,852 A | * | 11/1991 | Marti .................. 198/392 |
| 5,297,666 A | | 3/1994 | Sala |
| 5,549,189 A | * | 8/1996 | Martisala .................. 198/392 |
| 5,769,203 A | | 6/1998 | Sala |
| 7,117,987 B2 | | 10/2006 | Nalbach |
| 7,258,222 B2 | * | 8/2007 | Sala et al. .................. 198/393 |

FOREIGN PATENT DOCUMENTS

| | | |
|---|---|---|
| GB | 15558379 | 12/1979 |
| JP | 60048820 | 3/1985 |
| JP | 61166419 | 7/1986 |

* cited by examiner

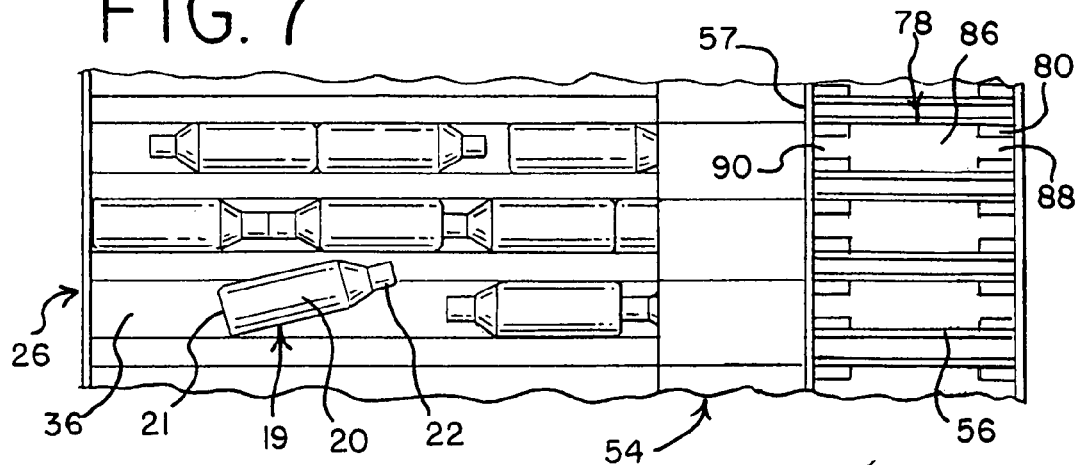
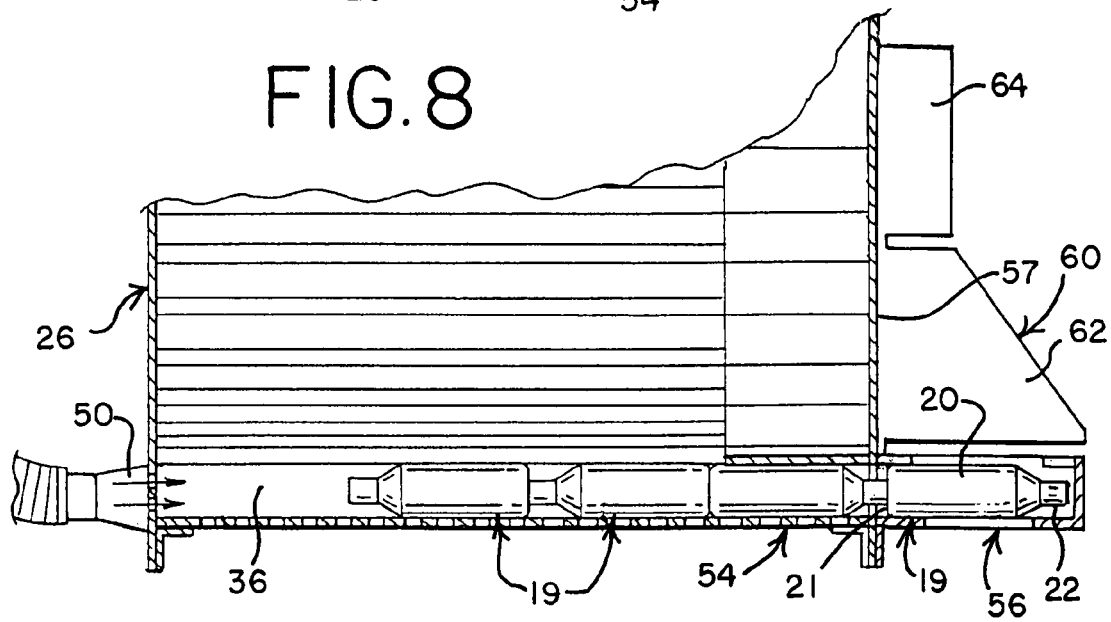
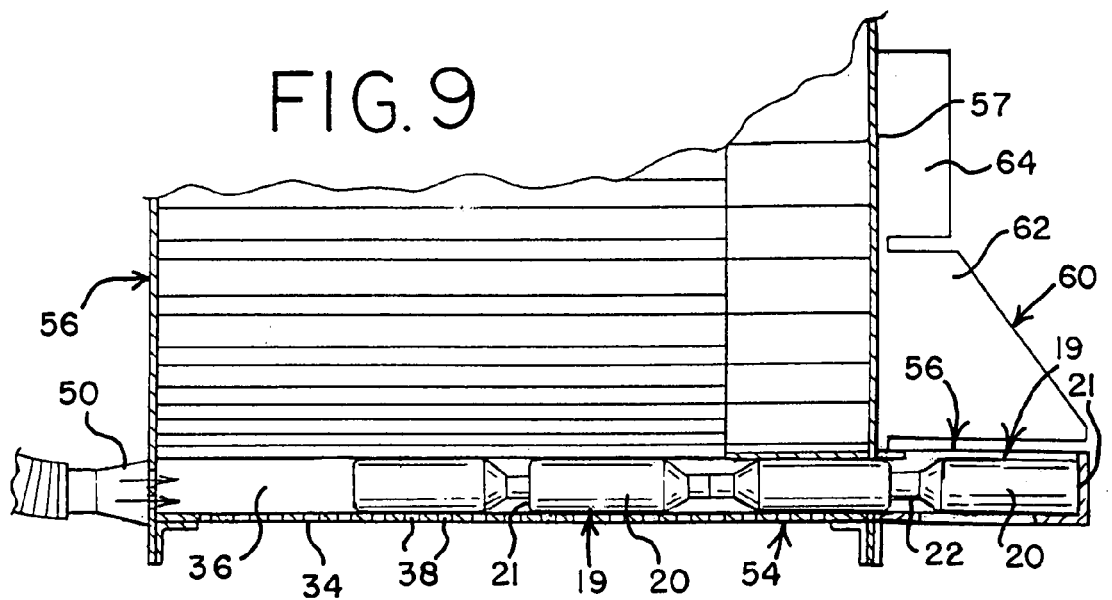

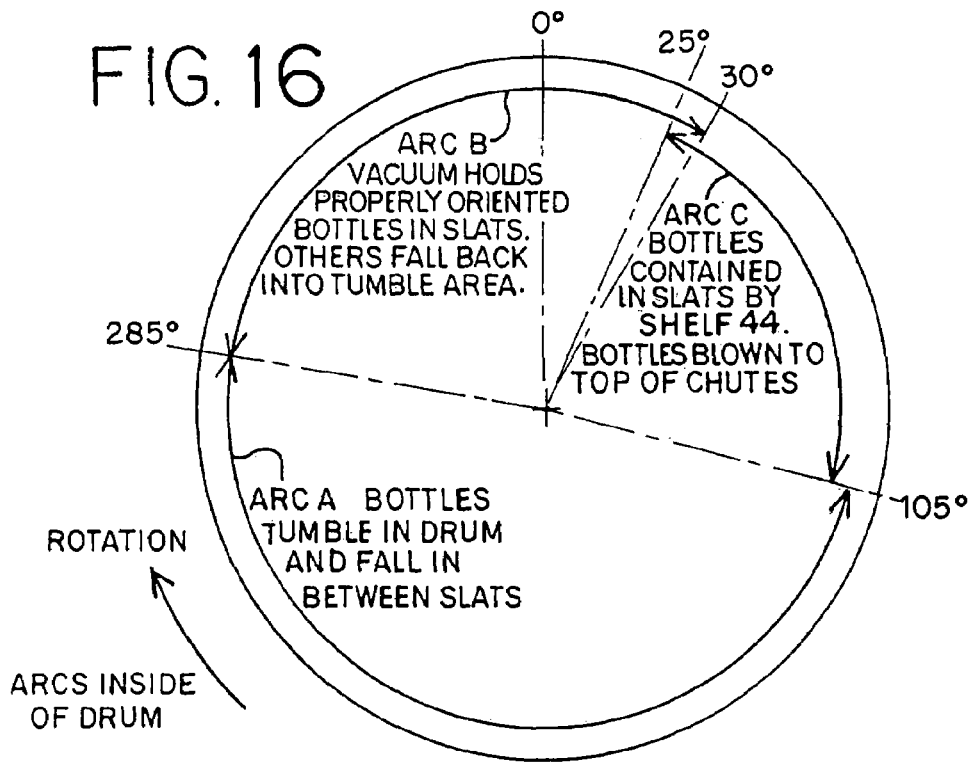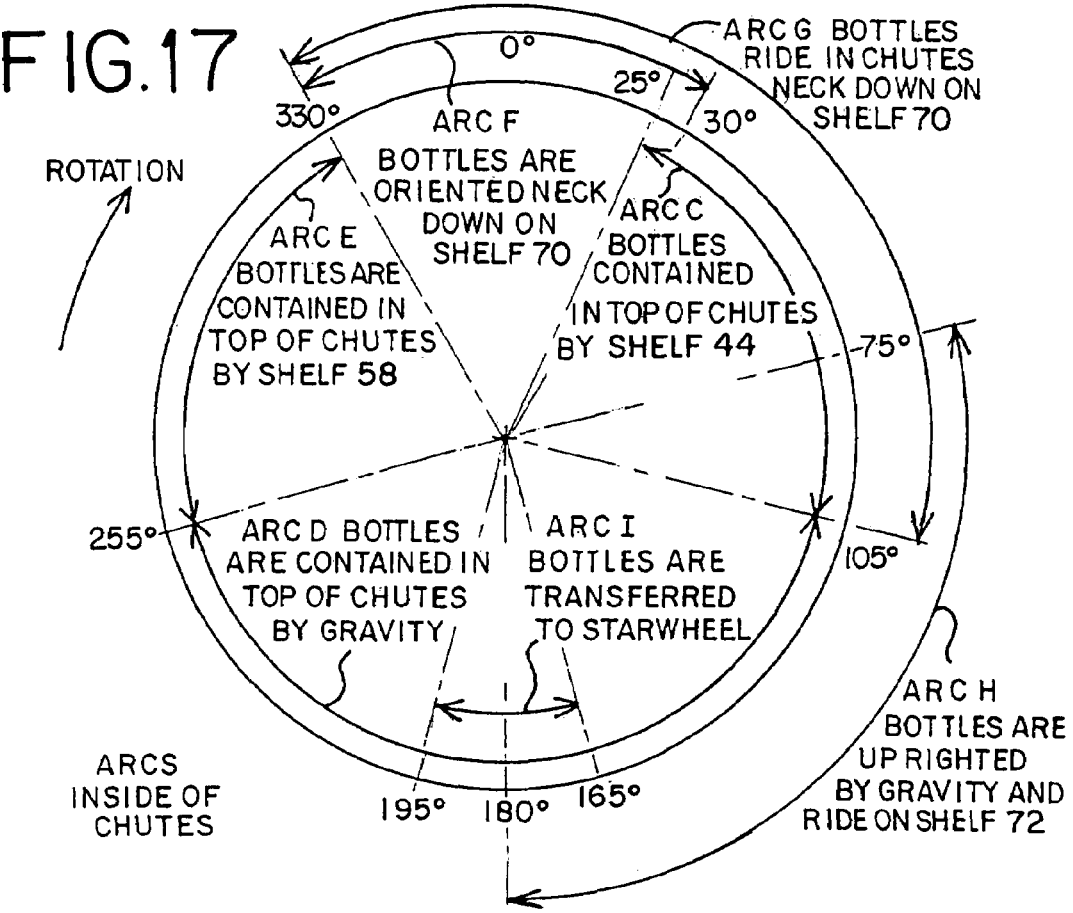

ARTICLE ORIENTATING APPARATUS

FIELD OF THE INVENTION

The invention relates to that group of machines commonly known as unscramblers. An unscrambler orients lightweight articles from a randomly oriented attitude to a uniform vertical upright attitude for use in additional processes, such as filling.

BACKGROUND OF THE INVENTION

Lightweight plastic articles are used as bottles or containers for a variety of purposes such as holding water or soft drinks and a wide variety of additional products. There has been an expansion in the use of plastic bottles and that expanded utilization of the plastic bottles has required the development of faster machines which are capable of handling large numbers of those lightweight bottles. The inventor of the present invention is the patentee of U.S. Pat. No. 7,117,987, entitled "Article Orientating Apparatus" issued Oct. 10, 2006; U.S. Pat. No. 3,650,368, entitled, "Article Orientating Apparatus" issued Mar. 21, 1972; U.S. Pat. No. 3,662,872, entitled, "Apparatus for Orientating and Feeding Articles" issued May 16, 1972; U.S. Pat. No. 3,948,386, entitled, "Apparatus for Orientating and Feeding Articles" issued Apr. 6, 1976; and U.S. Pat. No. 4,825,695, entitled "Article Orientating Apparatus" issued May 2, 1989.

The bottles have progressively become lighter and the volume of the number of bottles produced has increased so that the speed of unscrambling machines has necessarily increased to handle the increase in numbers of bottles. It is necessary to have positive positioning of the lightweight bottles, all at a high rate of speed. The present invention utilizes gravitational forces to stabilize the lightweight bottles thereby allowing high speed orientation of the bottles.

SUMMARY OF THE INVENTION

The present invention provides an improved orientating apparatus to align lightweight articles such as plastic bottles so that the plastic bottles are delivered in a stable upright attitude with the bottle supported on its bottom. The apparatus includes a drum rotatable about a substantially horizontal drum axis. A plurality of alignment troughs is mounted on the interior of the drum. Each alignment trough has a trough axis parallel to the drum axis. Each alignment trough is adapted for receiving and carrying at least one bottle in a respective trough with the longitudinal axis of the bottle aligned with the trough axis. An air reduction assembly positioned at a selected location adjacent to a portion of the drum exhausts air from the interior of the drum through the troughs to hold temporarily bottles in their respective troughs. A chute is positioned adjacent to one end of each trough for receiving a bottle from the respective trough. The chute orients the bottle to a neck down attitude. A stall rotatable with the drum in a stall path is positioned adjacent to each chute for receiving from the respective chute a bottle in a neck down attitude. Each stall is rotated to place the bottle in a neck up attitude. A retriever is positioned adjacent to the stall path for receiving vertically aligned upright bottles from the stalls and delivering the bottles to a conveyor to be carried away from the drum.

BRIEF DESCRIPTION OF THE DRAWINGS

FIG. 7 is a fragmentary cross sectional view showing bottles held in troughs;

FIG. 8 is taken on Line 8-8 of FIG. 3 being a cross sectional view showing bottles moving along an alignment trough into a receiver and into a chute at the end of the trough;

FIG. 9 is a cross sectional view like FIG. 8, but with a bottle aligned in a chute in the opposite direction to that shown in FIG. 8;

FIG. 16 is a chart showing arcs of movement of bottles in the drum; and

FIG. 17 is a chart showing arcs of movement of the bottles from the time of leaving the chute to retrieval of the bottles by the starwheel.

DETAILED DESCRIPTION OF THE PREFERRED EMBODIMENT

Figure 1:
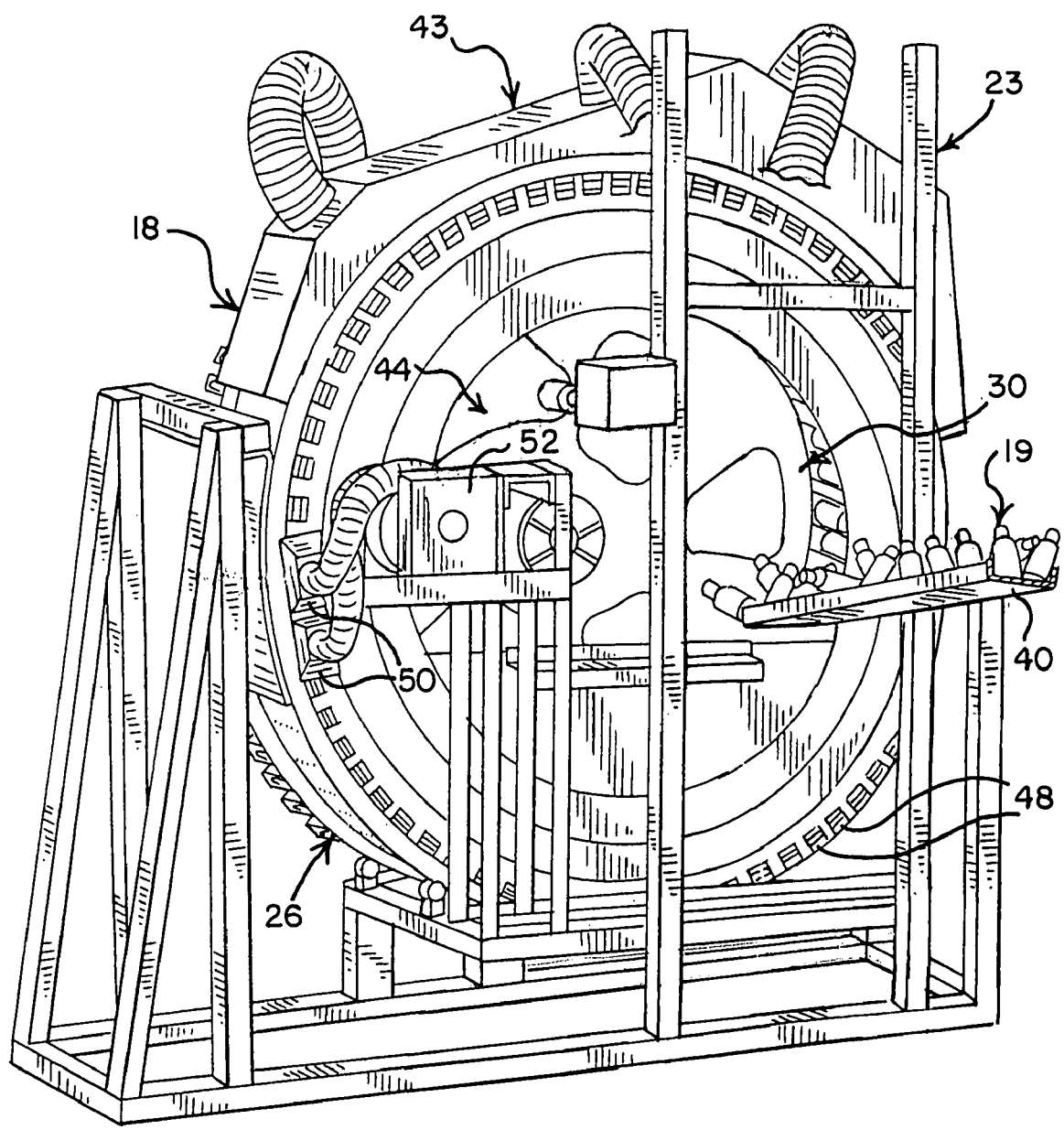
FIG. 1 is a perspective view of an unscrambler embodying the present invention showing lightweight plastic bottles being loaded into the unscrambler.
Figure 2:
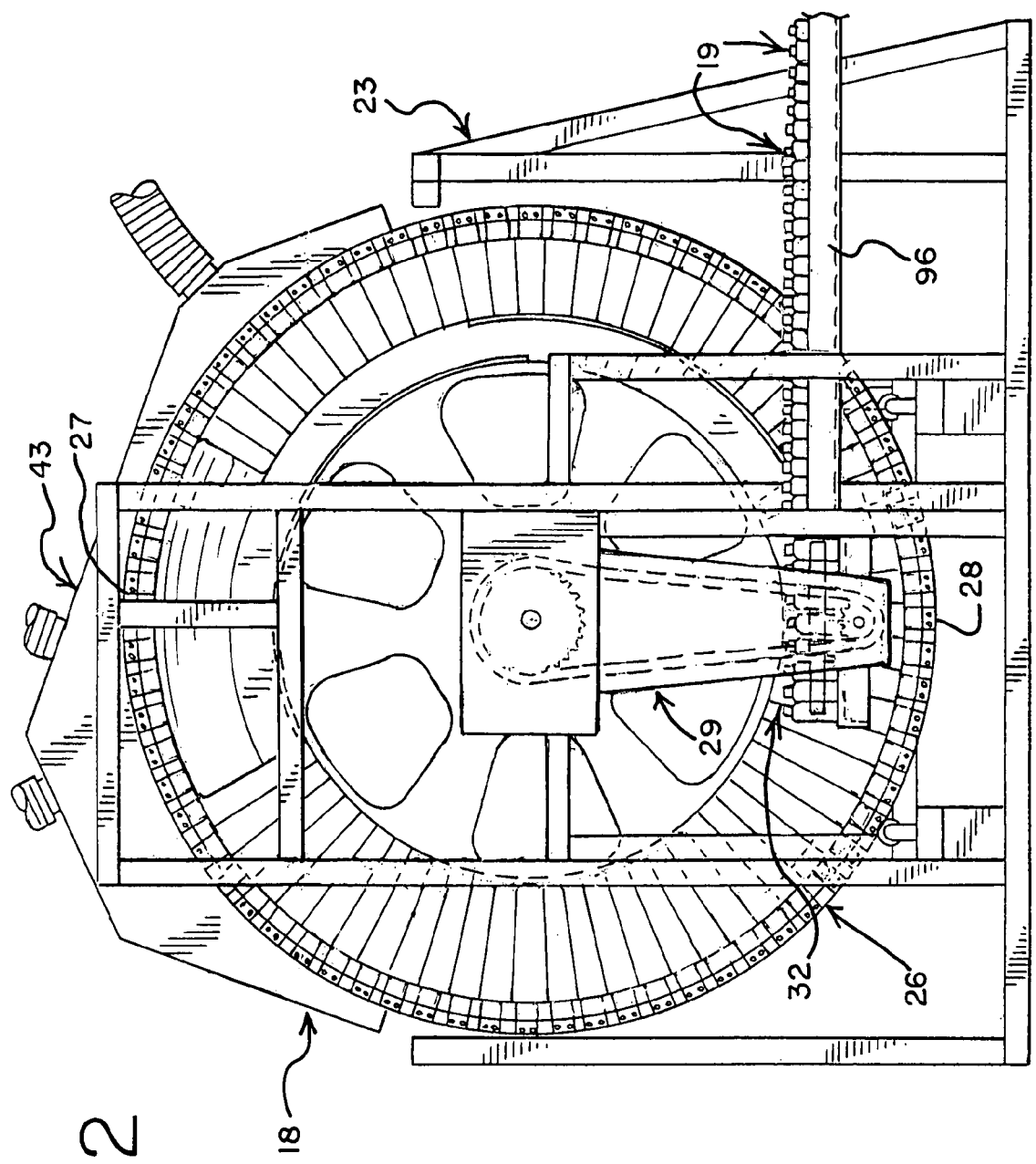
FIG. 2 is a side elevational view of the unscrambler of FIG. 1, showing the discharge side of the unscrambler and a conveyor carrying away aligned bottles.
Figure 3:
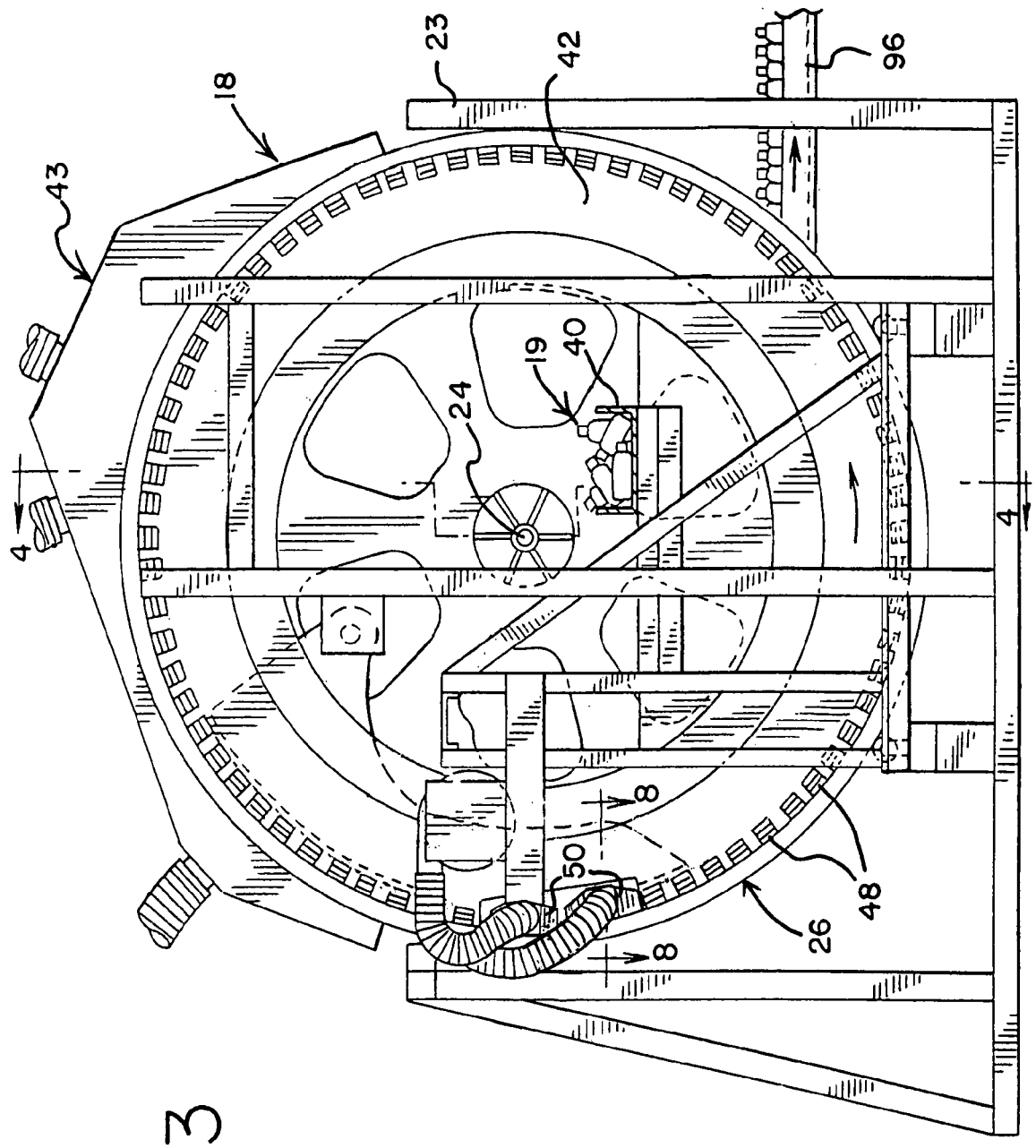
FIG. 3 is a side elevational view of the unscrambler of FIG. 1 showing the loading side of the unscrambler.

Referring now to the drawings, and especially to FIG. 1, an apparatus for orienting lightweight articles, such as, plastic bottles, sometimes referred to as an unscrambler, is shown therein generally indicated by numeral 18. Unscrambler 18 is a specific embodiment of the present invention and in this instance is used to orient and align conventional lightweight plastic bottles or containers generally identified by numeral 19. The bottles are typically used for holding water or soft drinks. Each of the bottles has a conventional construction including a rounded body 20 and a longitudinal axis along the length of the body with a bottom 21 on one end of the axis and an open neck 22 at the opposite end of the axis. Unscrambler 18 generally includes a frame 23 which has a horizontal drum axle 24 rotatably mounted in the frame. A drum or wheel 26 is secured to the axle so that the drum rotates in a continuous 360° circular drum path about a horizontal drum axis of rotation. As viewed in FIG. 2, the uppermost portion or top of the circular drum path is identified by numeral 27, and the lowermost portion or bottom is identified by numeral 28. For purposes of identification of positions along the drum path, the top is identified as 0° (or 360°) with increasing numbers in the direction of rotation of the wheel so that the bottom is at 180°. The numbers identifying positions of the drive continue from the bottom to complete the 360° at the top. A conventional drive assembly 29 drives the axle from a conventional power source which is not shown herein.

The drum has an interior loading portion 30 and an exterior discharge portion 32. The interior loading portion includes a continuous outer peripheral wall 34 with a plurality of slats 35 mounted on the interior of the peripheral wall to form identical alignment troughs 36. The alignment troughs rotate in a trough path with the drum about the horizontal drum axis of rotation. Each of the troughs 36 has a longitudinal trough axis parallel to the horizontal axis of rotation. Each trough has a width which is slightly greater than the width of each of the bottles. The length of each of the troughs is sufficient to receive more than one bottle in the trough. Peripheral wall 34 of the drum has a plurality of apertures 38 contained therein communicating with the troughs so that all troughs have apertures.

Figure 4:
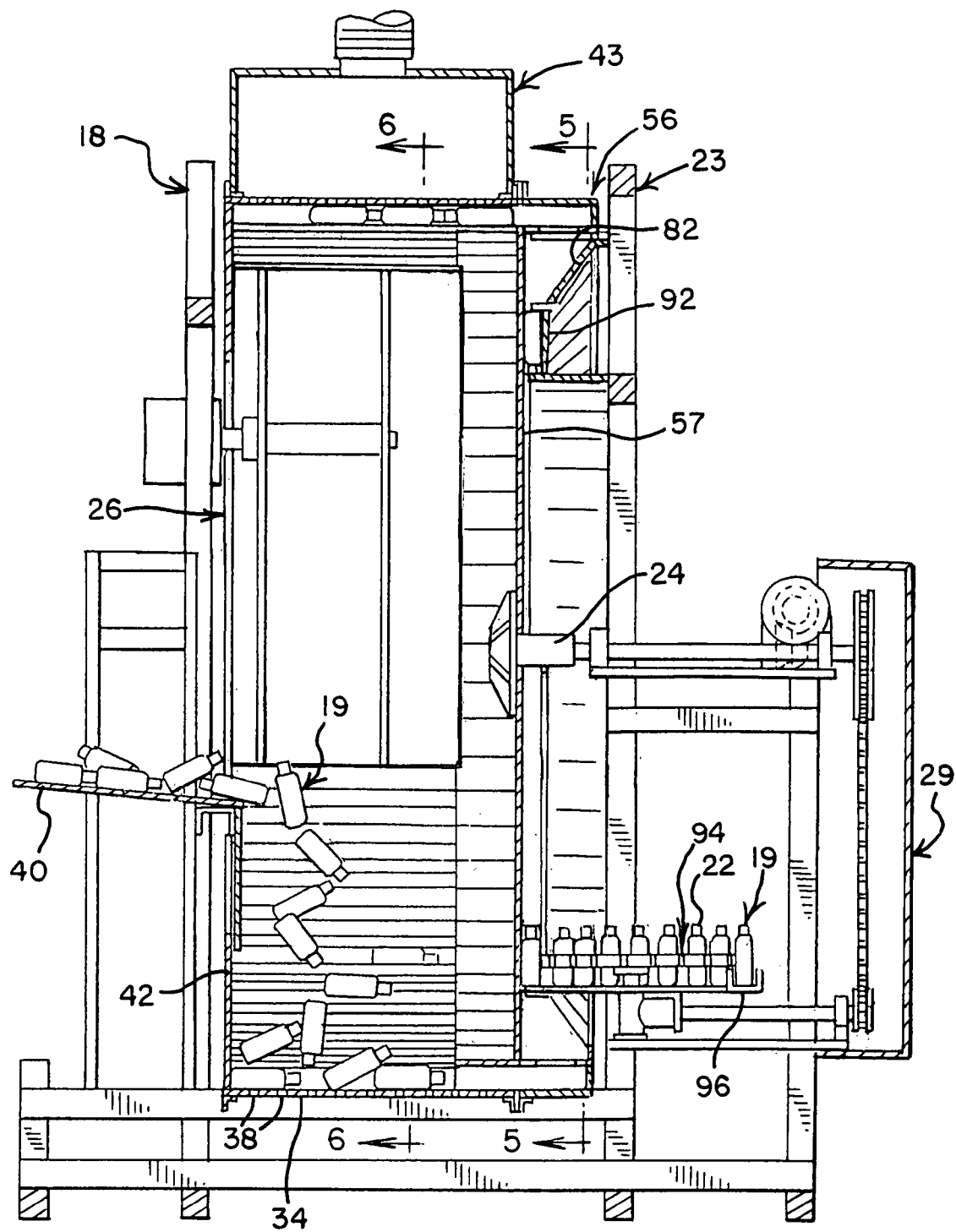
FIG. 4 is a cross sectional view of the unscrambler of FIG. 1 taken on line 4-4 of FIG. 3 showing bottles being loaded into the unscrambler and aligned bottles being retrieved from the unscrambler.

Bottles 19 to be aligned by the unscrambler are carried on a chute 40 and fall into the drum in a random fashion such as that shown in FIG. 4. The drum is continuously rotated and the bottles tumble within the drum and are retained within the drum by a sidewall 42. Some of the bottles fall into respective troughs with the article axis of the bottle aligned with the trough axis. As the drum rotates, the troughs move in a circular trough path so that a trough in the bottom position of the drum, that is, 180° is moved upward toward the uppermost portion 360°. Any bottles which are not secure in a trough moving toward uppermost portion 27 tumble back down toward the lowermost portion of the drum to seek positioning in a succeeding trough. When a trough is positioned 15° past the horizontal, that is, at 285°, the trough is positioned in an area covered by a plenum or hood 43. A conventional source for evacuating air is connected to the hood. The source evacuates air from the troughs through apertures 38 in the peripheral wall of the drum. The flow of air from the interior of the drum into the troughs and out of the troughs through the apertures holds bottles in respective troughs under the hood. The hood extends 30° past the top so that the bottles are held in place in respective troughs through an arc of 105°, which arc is identified as arc B in FIG. 16.

Figure 6:
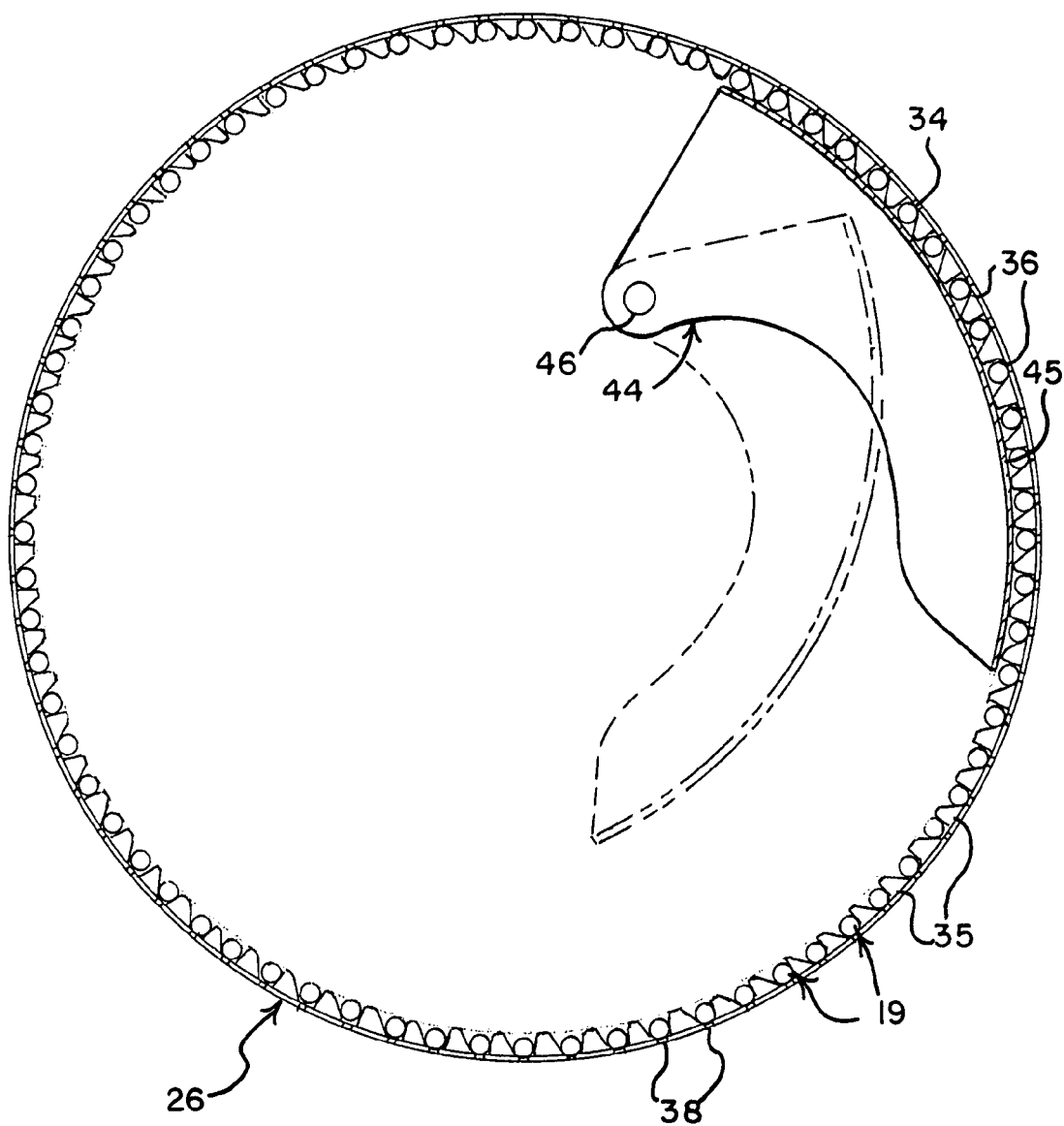
FIG. 6 is taken on line 6-6 of FIG. 4 showing bottles in initial alignment and a trough shelf for holding the bottles in position; and the trough shelf being shown in dotted form in a displaced attitude in the event that a bottle should be retained out of alignment and thereby displace the shelf.

Looking now to FIG. 6, a pivotal trough shelf 44 has a curved retaining surface 45 conforming to the trough path. The retaining surface is positioned adjacent to the innermost surface of the slats forming the troughs to retain the bottles in the troughs moving past shelf 44. Retaining surface 45 extends from a position 25° from the top to a position 105° from the top, and is identified as arc C in FIGS. 16 and 17. There is an overlap of 5° wherein air pulled into the hood retains bottles in the troughs and shelf 44 also prevents the bottles from leaving respective troughs thereby reducing the likelihood of a mishap. Shelf 44 is mounted on a shelf shaft 46 which allows shelf 44 to pivot in the event that a bottle is retained inward toward the interior of the drum outside of a trough as it approaches the shelf. The offending bottle displaces the shelf by pivoting the shelf on the shaft as shown in dotted form in FIG. 6 to prevent damage to the unscrambler or a jamming the bottle between the shelf and the slats. Shelf 44 by means of a conventional detent not shown is returned to its intended operative position once the offending bottle in engagement with the shelf is released. The bottles contained in the troughs are retained in the troughs by shelf 44 until the troughs move to a position 15° below the horizontal, that is, 105° from the top. The bottles retained in the troughs by shelf 44 are free to move axially along the length of the respective trough.

Each of the troughs has an air propulsion aperture 48 aligned with the length of the trough on the loading side of sidewall 42. A pair of pressure manifolds 50 is positioned adjacent to the loading side of the sidewall to cover temporarily each aperture 48 as the drum rotates as shown in FIGS. 8 and 9. Air under pressure from a conventional blower 52 is forced through the propulsion apertures into respective troughs. The air under pressure pushes a bottle in a trough axially along the length of the trough into holding receiver 54 fixed to the end of each trough. The bottle is moved from the holding receiver to an inversion chute 56 fixed to and aligned with each holding receiver. The chutes rotate in a chute path with the rotation of the drum.

Figure 10:
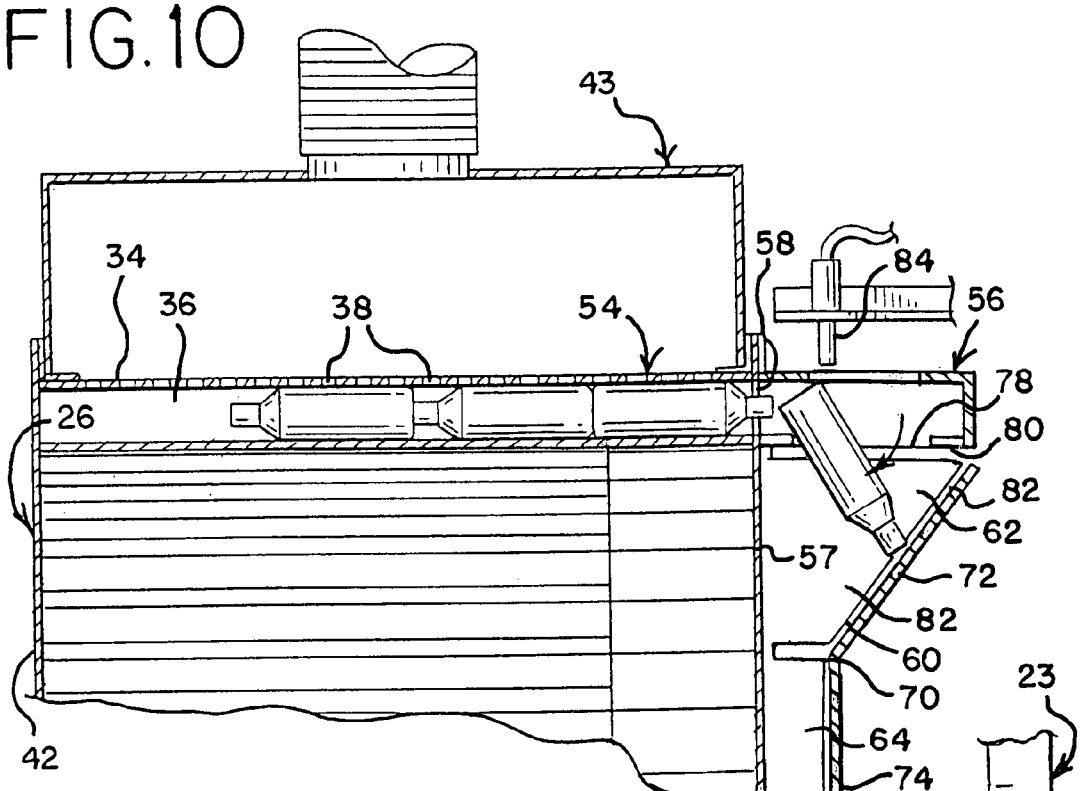
FIG. 10 is a cross sectional view showing a bottle discharged from a chute bottom side up when the bottle entered the chute neck first.
Figure 11:
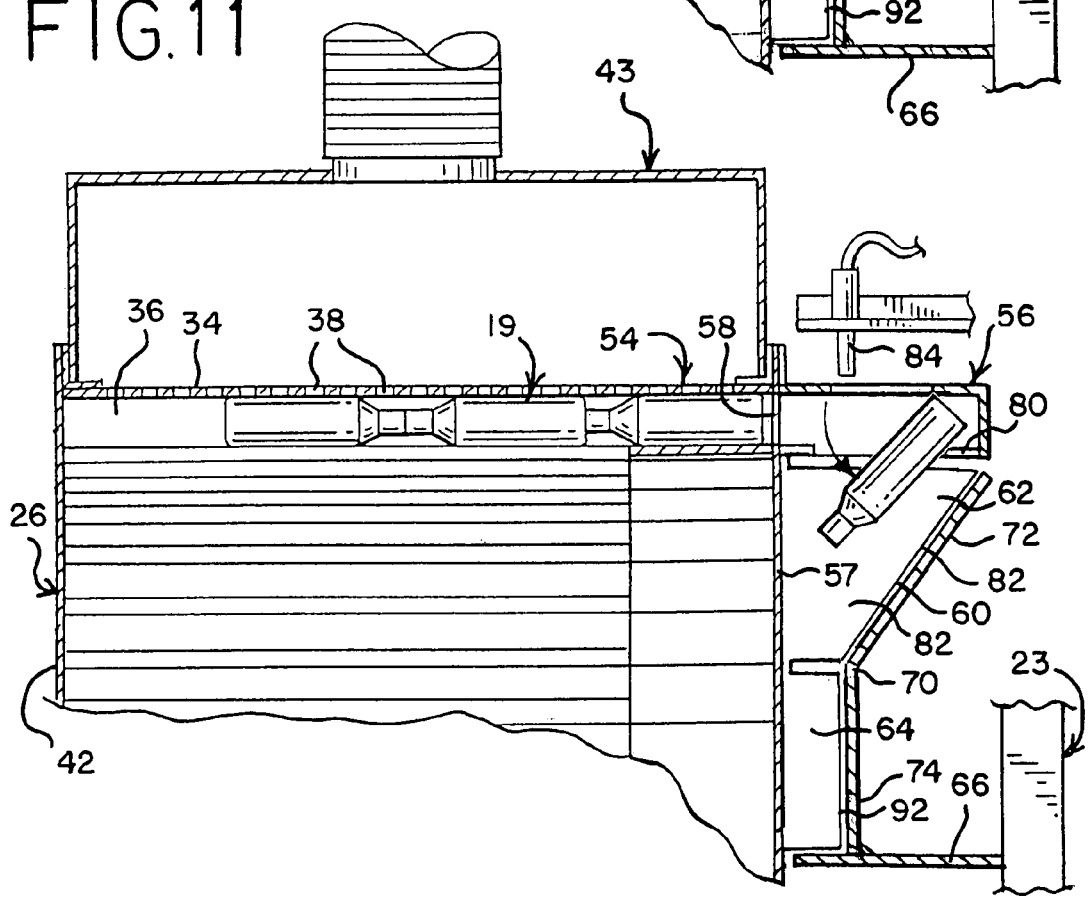
FIG. 11 is similar to FIG. 10, but showing a bottle discharged from a chute bottom side up when the bottle entered the chute bottom first.
Figure 12:
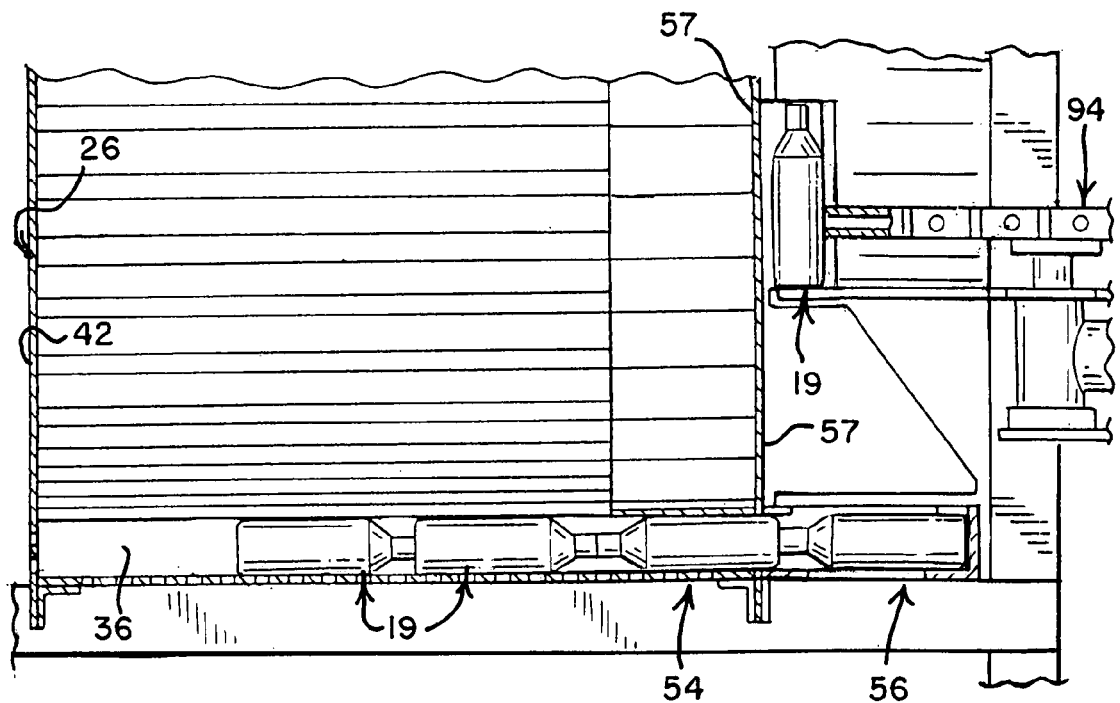
FIG. 12 is a cross sectional view showing a bottle being removed from the unscrambler in a vertical attitude and bottles in a trough receiver and chute.
Figure 13:
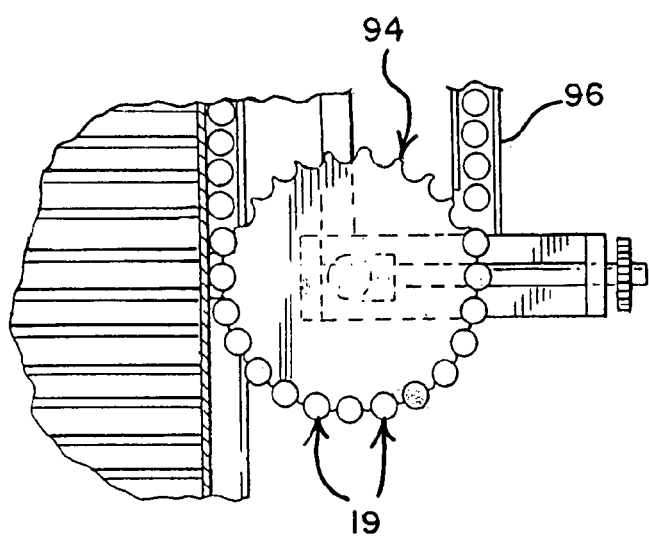
FIG. 13 is a plan view of a starwheel removing aligned bottles.

The drum includes a discharge wall 57 defining a portion of the holding receiver. A plurality of exit apertures 58 is formed in the discharge wall with an exit aperture aligned with each holding receiver. A plurality of radial sidewalls 60 is mounted on the discharge wall. As may be seen in FIG. 5, the radial sidewalls are radially set about the axle of the drum and each sidewall is positioned between the adjacent exit apertures. Each radial sidewall 60 consists of a generally trapezoidal hopper wall 62 and a generally rectangular stall wall 64 as shown in FIGS. 10 and 11. A radial stall shelf 66 and a radial unloading shelf 68 are mounted on frame 23. A compartment wall 70 is secured to the stall shelf and the unloading shelf. The compartment wall includes an inclined outer hopper portion 72 and an integral stall portion 74.

Figure 5:
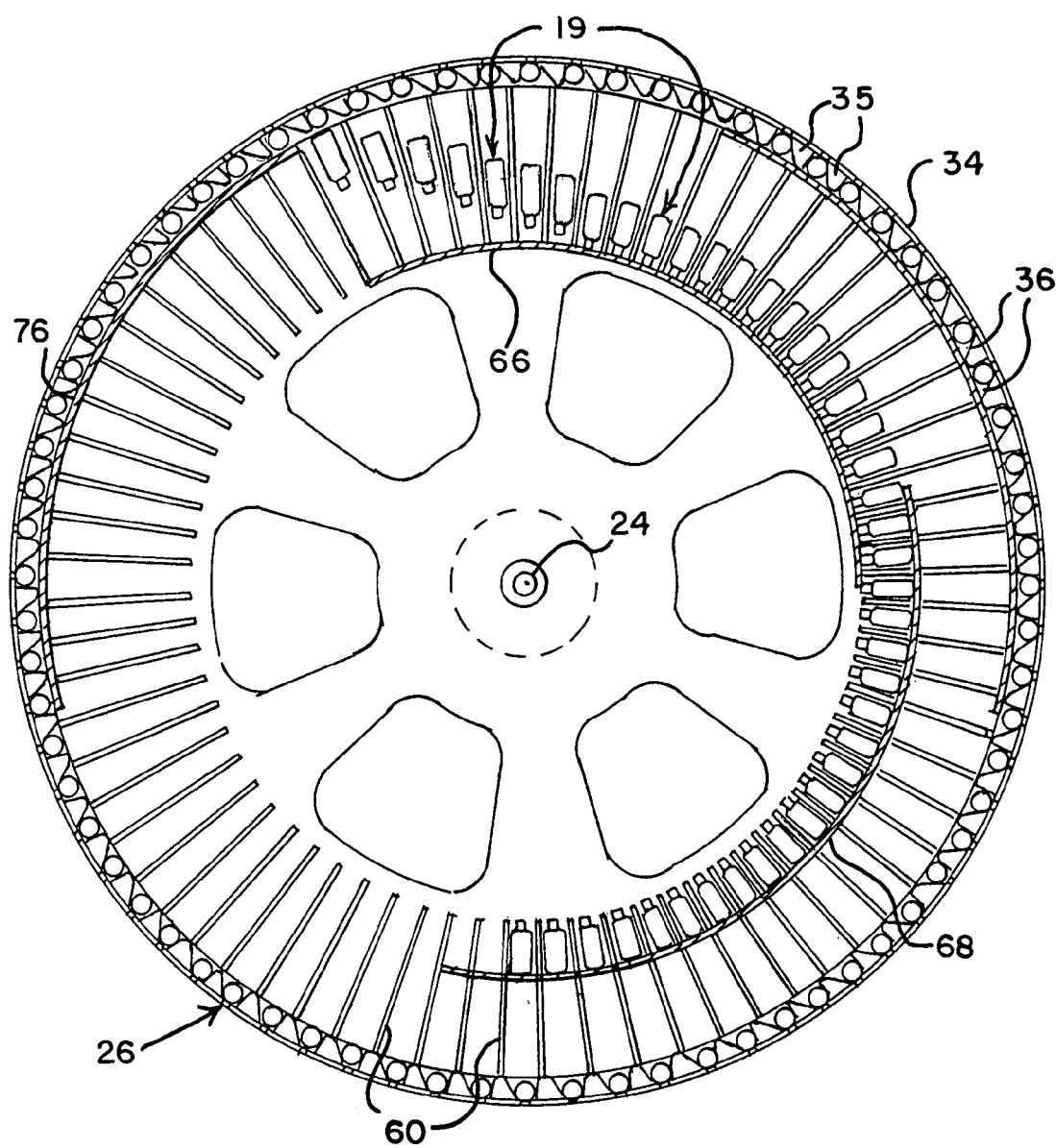
FIG. 5 is a cross sectional view taken on line 5-5 of FIG. 4 showing shelves engaging bottles in the unscrambler at various stages of positioning of the bottles.
Figure 14:
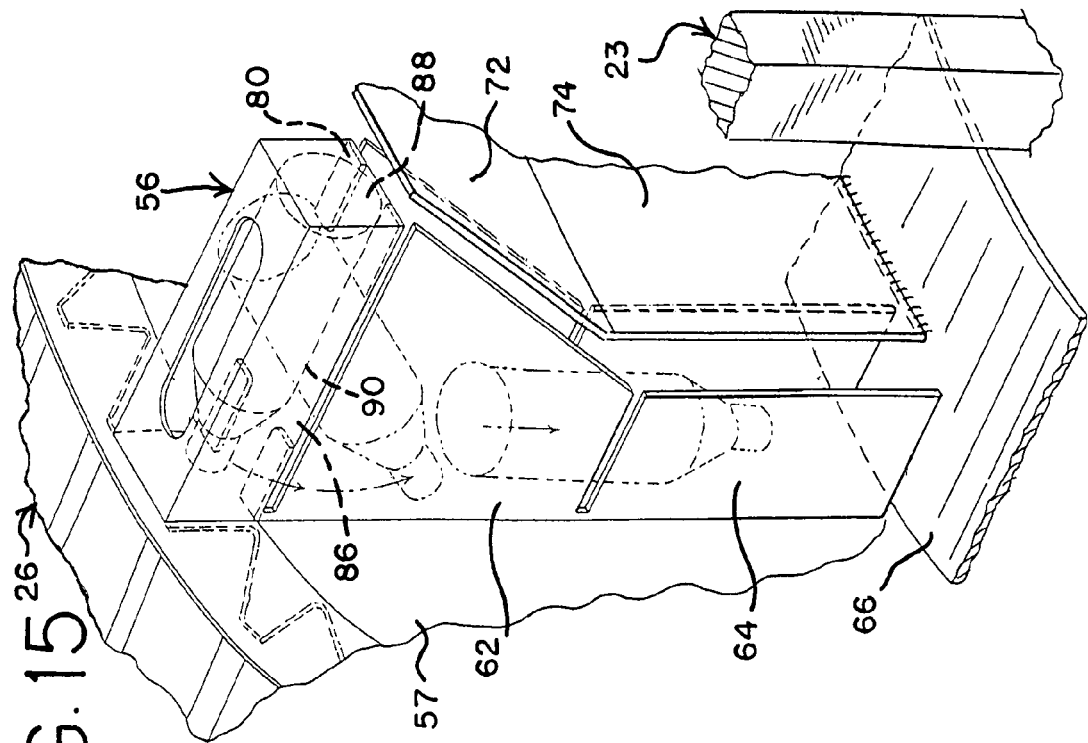
FIG. 14 is an enlarged fragmentary view showing movement of a bottle from a chute to a vertical attitude wherein the bottle entered the chute neck first.
Figure 15:
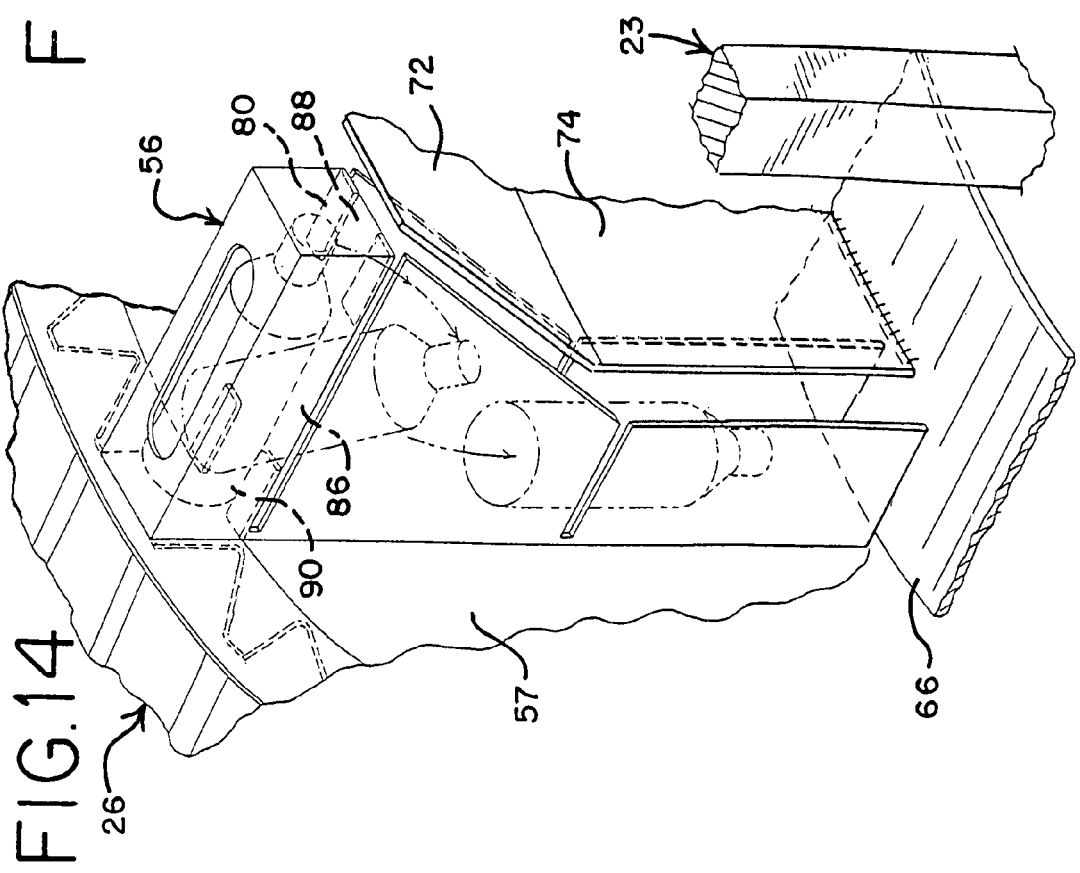
FIG. 15 is similar to FIG. 14, but showing the operation of a bottle having entered the chute bottom first.

Bottles contained in the respective chutes are kept in the outermost side of the chute due to gravity as the bottles move from 105° toward the lowermost portion of the drum path and then upward toward the 255° position in a path identified as arc D in FIG. 17. A fixed chute shelf 76 extends from 15° below the horizontal, that is 255°, to 30° from the top, that is, 330°, identified as arc E in FIG. 17. Thus, the bottles are contained in their respective chutes until a position 30° before the top or 330°. The compartment wall covers the radial sidewalls from 330° to 180°. When a bottle in a respective chute reaches the end of chute shelf 76, the bottle drops through an alignment aperture 78 in chute floor 80 into a hopper 82 defined by trapezoidal hopper walls of a pair of adjacent radial sidewalls 60, the discharge wall 57 and the inclined outer hopper portion of the compartment wall. An air nozzle 84 is positioned above the chute path to provide an air stream and thereby assist the bottle's passage through the alignment aperture. It is immaterial as to whether the bottle enters the chute neck first or bottom first. Aperture 78 has a body opening 86 with neck openings 88 and 90 at opposite ends of opening 86. As may be seen in FIGS. 10 and 14, if the bottle enters the chute neck first, the neck falls down through opening 88 so that the bottle falls neck first. However, if the bottle enters the chute bottom first, as shown in FIGS. 11 and 15, the neck of the bottle falls down through opening 90 so that the neck is down first. In either case, the bottle falls neck first from the hopper to a radial stall 92 communicating with the hopper. Each radial stall is formed by adjacent rectangular stall walls of adjacent radial sidewalls, the discharge wall, and the stall portion of the compartment wall. The stall with its radial sidewalls is perpendicular to the horizontal drum axis of rotation. The bottle slides down the stall into engagement with stall shelf 66. The movement of the bottle from the chute to the stall shelf occurs in 60° of rotation of the drum and is identified as arc F in FIG. 17. The stall shelf extends from 30° to the top, that is, 330° to 15° past the horizontal, that is, 105° identified as arc G in FIG. 17. Unloading shelf 68 extends from a position 15° above the horizontal, that is, 75° to 15° past the bottom, that is, 195°. The unloading shelf overlaps the stall shelf by 30°, as shown in FIGS. 5 and 17. The arc of the unloading shelf is identified as arc H in FIG. 17.

As may be best seen in FIG. 5, a given bottle leaves its chute 56 and enters its radial stall 92 through the hopper 82 and rests on stall shelf 66 in an inverted attitude, that is, neck down. The rotation of the drum carries the bottle to a juncture of the stall shelf and the unloading shelf. Once the bottle passes the 90° point of the drum, gravity and the centrifugal force caused by the rotation of the bottle with the drum causes the bottom of the bottle to have a firm engagement with unloading shelf 68. The bottle reaches the lowermost portion or 180° in a vertical neck up attitude in a steady state.

A conventional starwheel 94 is mounted adjacent to the exterior portion of the drum at the bottom of the drum path rotation where the compartment wall ends to allow bottles to be extracted from the stalls. The bottles contained in the stalls in a stable upright attitude are engaged by starwheel 94 and carried to a conventional discharge conveyor 96 to be delivered in a continuous upright line of bottles.

The present unscrambler allows the bottles to move from a random arrangement to an attitude where the bottles are aligned in troughs 36 with the longitudinal axis of the bottles aligned with the horizontal axis of rotation of drum. The bottles are moved longitudinally in the trough to a respective inversion chute 56. The bottles are allowed to reach a state of equilibrium after the longitudinal movement in the respective trough. The longitudinal axis of the bottle in the chute is parallel to the horizontal axis of rotation of the drum. Discharge of the bottle from the chute changes the attitude of the bottle to one in which its longitudinal axis is perpendicular to the axis of rotation of the drum. Each of the bottles is held in the changed attitude to allow each of the bottles to achieve a steady state. The force of gravity plus the centrifugal force generated by the rotation of the drum tends to keep the bottle in an attitude perpendicular to the axis of rotation of the drum and thereby effects a steady upright position for each bottle to be delivered to star wheel 94 and then to discharge conveyor 96 to be carried away in an inline upright attitude.

Although the invention has been described in detail above, it is readily apparent that those skilled in the art may make various modifications and changes in the instant invention without departing from the spirit and scope of the present invention. It is to be expressly understood that the scope of the instant invention is limited only by the appended claims.

What is claimed is:

1. An apparatus for orienting lightweight articles having an open neck and an opposed supporting bottom comprising: an open drum continuously rotatable in a 360° circular drum path about a substantially horizontal drum axis, said drum path having a top and bottom, a plurality of elongated alignment troughs mounted on the interior of the drum for rotation with the drum in a continuous trough path, each alignment trough having a longitudinal trough axis substantially parallel to the drum axis, each trough being adapted for receiving and carrying at least one lightweight article, a hood adjacent to the uppermost portion of the drum path to carry away air from the interior of the drum for temporarily holding lightweight articles in their respective troughs, a chute adjacent to one end of each trough, each chute moving with the drum in a circular chute path for receiving a lightweight article from the respective trough, and a stall positioned adjacent to each chute, each stall rotatable with the drum in a circular stall path receiving an article from the respective chute in a neck down attitude adjacent to the top of the drum path, whereby rotation of the stall to the bottom of the drum path inverts the article to a neck up attitude for discharge from the apparatus.

2. An apparatus for orienting lightweight articles having an open neck and an opposed supporting bottom as defined in claim 1 including, an trough shelf positioned adjacent to a portion of the trough path retaining articles in troughs while adjacent to the trough shelf.

3. An apparatus for orienting lightweight articles having an open neck and an opposed supporting bottom as defined in claim 1 including, an trough shelf positioned adjacent to a portion of the trough path to retain lightweight articles in the troughs adjacent to the trough shelf, said trough shelf being pivotally mounted to be displaced by a lightweight article carried in the drum having a portion extending inward beyond the trough path.

4. An apparatus for orienting lightweight articles having an open neck and an opposed supporting bottom as defined in claim 1 including, a chute shelf positioned adjacent to the chute path retaining lightweight articles in the chutes approaching the top of the chute path, said chute shelf terminating prior to the top of the drum path.

5. An apparatus for orienting lightweight articles having an open neck and an opposed supporting bottom as defined in claim 1 including, a fixed stall shelf positioned adjacent to the stall path for retaining lightweight articles in respective stalls received from the respective chute with the neck adjacent to the stall shelf.

6. An apparatus for orienting lightweight articles having an open neck and an opposed supporting bottom as defined in claim 1 including, an unloading shelf positioned adjacent to a portion of the stall path and extending to the bottom of the drum path holding lightweight articles in their respective stalls in an attitude with each article bottom supported on the unloading shelf.

7. An apparatus for orienting lightweight articles having an open neck and an opposed supporting bottom as defined in claim 1 including, a trough shelf positioned adjacent to a portion of the trough path to retain lightweight articles in the troughs adjacent to the trough shelf, and a fixed chute shelf positioned adjacent to the chute path and extending toward the top of the drum path for retaining lightweight articles in the chutes approaching the top of the drum path.

8. An apparatus for orienting lightweight articles having an open neck and an opposed supporting bottom as defined in claim 1 including, a fixed unloading shelf adjacent to a portion of the stall path supporting an article in each stall with each article bottom supported by the unloading shelf.

9. An apparatus for orienting lightweight articles having an open neck and an opposed supporting bottom as defined in claim 1 including, a trough shelf positioned adjacent to a portion of the trough path retaining lightweight articles in the troughs adjacent to the trough shelf, and a source of air under pressure to supply air under pressure along the length of a trough when the trough is adjacent to the trough shelf to move a lightweight article along the length of the trough into the respective chute.

10. An apparatus for orienting lightweight articles having an open neck and an opposed supporting bottom as defined in claim 1 including, a trough shelf positioned adjacent to a portion of the trough path retaining a lightweight article in a respective trough adjacent to the trough shelf, a fixed chute shelf positioned adjacent to the chute path retaining a lightweight article in the respective chute approaching the top of the drum path, and a fixed unloading shelf adjacent to a portion of the stall path extending to the bottom of the drum path.

11. An apparatus for orienting lightweight articles having an open neck and an opposed supporting bottom as defined in claim 1 including, a trough shelf positioned adjacent to a portion of the trough path retaining a lightweight article in the respective trough adjacent to the trough shelf, a fixed chute shelf positioned adjacent to a portion of the chute path retaining a lightweight article in the respective chute approaching an uppermost portion of the chute path, and a fixed stall shelf positioned adjacent to a portion of stall path retaining a lightweight article in the respective stall with the article neck adjacent to the stall shelf.

12. An apparatus for orienting lightweight articles having an open neck and an opposed supporting bottom as defined in claim 1, wherein the outer periphery of the drum has at least one aperture communicating with each of the troughs, a trough shelf positioned adjacent to a portion of the trough path for temporarily retaining an article in the respective trough, a source of air under pressure alignable with and directed into each trough as it passes the source of air to move an article in a respective trough longitudinally from the trough into the respective chute, a fixed chute shelf positioned adjacent to a portion of the chute path for temporarily retaining an article in the respective chute, a fixed stall shelf positioned adjacent to a portion of the stall path for temporarily retaining an article in a respective stall, and an unloading shelf positioned adjacent to a portion of the stall path for retaining an article with the article bottom supported on the unloading shelf.

13. An apparatus for orienting lightweight articles having an open neck and an opposed supporting bottom as defined in claim 1 including, a trough shelf positioned adjacent to the trough path retaining lightweight articles in respective troughs, a fixed source of air under pressure positioned externally of the drum to supply air under pressure along the length of a trough when the trough is positioned adjacent to the source of air to move a lightweight article along the length of the trough into the respective chute, a stall shelf positioned adjacent to a portion of the stall path retaining a lightweight article in the stall received from the respective chute, and an unloading shelf positioned adjacent to a portion of the stall path and overlapping a short distance the stall shelf for holding lightweight articles in their respective stalls in an attitude with each article bottom supported on the unloading shelf.

14. An apparatus for orienting lightweight articles having an open neck and an opposed supporting bottom as defined in claim 1 including, a trough shelf positioned adjacent to an uppermost portion of the trough path retaining lightweight articles in respective troughs adjacent to the shelf, said trough shelf being pivotally mounted to be pivotally displaceable by a lightweight article carried in the drum and extending inward beyond the trough path, a source of air under pressure is positioned externally of the drum to supply air under pressure along the length of a trough when positioned adjacent to the source of air to move a lightweight article in the trough into its respective chute, a chute shelf fixed adjacent to the chute path for retaining lightweight articles in respective chutes approaching an uppermost portion of the chute path and terminating prior to reaching the uppermost portion of the chute path, a stall shelf fixed adjacent to the uppermost portion of the drum path retaining lightweight articles in respective stalls delivered from the respective chutes with the article bottoms spaced from the stall shelf, and an unloading shelf adjacent to a portion of the stall path extending to the lowermost portion of the drum path for retaining lightweight articles in their respective stalls with each article bottom supported on the unloading shelf.

15. An apparatus for orienting lightweight articles having an open neck and an opposed supporting bottom as defined in claim 1 including, a trough shelf positioned adjacent to a portion of the trough path retaining lightweight articles in respective troughs, said trough shelf being pivotally mounted for pivotal displacement by a lightweight article carried in the wheel and extending inwardly beyond the trough path, a source of air to supply air under pressure along the length of a trough to move a lightweight article in the trough into a respective chute, a fixed chute shelf fixed adjacent to the chute path for retaining articles in respective chutes approaching an uppermost portion of the drum path and terminating prior to reaching the uppermost portion of the drum path, a stall shelf fixed adjacent to the uppermost portion of the drum path retaining lightweight articles in respective stalls delivered from the respective chutes with the article neck adjacent to the stall shelf, an unloading shelf fixed adjacent to the drum path extending to the lowermost portion of said drum path for retaining lightweight articles in their respective stalls with the article bottom supported on the unloading shelf, and a retrieval apparatus for removing from each stall a lightweight article in a substantially vertical bottom-down attitude.

16. An apparatus for orienting lightweight articles having a longitudinal article axis with a bottom on the axis and a neck on the axis opposite the bottom comprising; a drum rotatable about a substantially horizontal drum axis, said drum having a loading portion for receiving randomly oriented lightweight articles, said drum having a plurality of alignment troughs on its interior surface, each of said troughs adapted for receiving at least one article, each of said troughs having a longitudinal trough axis substantially parallel to the drum axis, an air pressure reduction assembly removing air from the interior of the drum holding lightweight articles in respective troughs by reducing air pressure between the trough and the lightweight article, a chute positioned at one end of each trough for receiving a lightweight article from its respective trough, each chute having a floor with an orienting aperture to allow an article to pass through the aperture only in a neck first attitude, a stall positioned adjacent to each chute for receiving a lightweight article in a neck down attitude from its respective chute, each stall being rotatable about the horizontal drum axis to change the attitude of each lightweight article in the stall from the neck down attitude to a bottom down attitude, and a retrieval apparatus positioned adjacent to the drum to remove from each stall a lightweight article in a substantially vertical bottom down attitude.

17. An apparatus for orienting lightweight articles wherein each article has a longitudinal article axis with opposed ends a bottom at one end and a neck at the opposite end comprising: a drum rotatable on a substantially horizontal drum axis, said drum having an intake portion for receiving randomly oriented lightweight articles, said drum having a plurality of alignment troughs on its interior surface, each of said troughs having a longitudinal trough axis substantially parallel to the horizontal drum axis, each of said troughs adapted for receiving an article having its longitudinal axis aligned with the longitudinal trough axis, a hood covering a portion of the drum to carry away air from the interior of the drum to retain lightweight articles in their respective troughs, an inversion chute aligned with each trough mounted on the drum, a fixed chute shelf retaining an article in its respective chute during a portion of the rotation of the drum, a radial stall mounted on the drum adjacent to each inversion chute to receive from the respective chute an article in a neck down attitude, a fixed stall shelf for holding an article in its respective radial stall for a portion of the rotation of the stall to change the article attitude from a neck down attitude to a neck up attitude, and a retrieval apparatus for removing from each stall a lightweight article in a substantially vertical bottom down attitude.

18. An apparatus for orienting lightweight articles having a longitudinal article axis with a bottom at one end and a neck at the opposite end comprising: a drum rotatable on a substantially horizontal drum axis, said drum having an intake portion for receiving randomly oriented lightweight articles, said drum having a plurality of alignment troughs mounted on its interior surface, each of said troughs having a longitudinal trough axis substantially parallel to the horizontal drum axis, each of said troughs adapted for receiving an article having its longitudinal axis aligned with the longitudinal trough axis, a hood covering a portion of the drum to carry away air from the interior of the drum to retain lightweight articles in their respective troughs during a portion of the rotation of the drum, an inversion chute aligned with each trough mounted on the drum, each inversion chute having a floor with an aperture to allow an article to pass through the aperture only in a neck first attitude, a fixed chute shelf positioned adjacent to the chute path for retaining an article in its respective chute in an attitude wherein the longitudinal axis of the article is aligned with the longitudinal trough axis during a portion of the rotation of the drum, said fixed chute shelf terminating adjacent to the uppermost portion of the drum path to allow the article in the chute to pass through the aperture to rotate substantially 90° to an attitude of the article with its longitudinal axis substantially perpendicular to the horizontal drum axis and the article neck closer to the drum axis than is the bottom of the article, a radial stall connected to the drum below each inversion chute to receive from the respective chute an article in a neck down attitude, a fixed stall shelf for holding an article in its respective radial stall for a portion of the rotation of the inversion stall, and a retrieval apparatus for removing from each stall the lightweight article in a substantially vertical bottom down attitude.

* * * * *